United States Patent [19]
Brittell

[11] Patent Number: 5,471,782
[45] Date of Patent: Dec. 5, 1995

[54] HEATED COCKROACH TRAP

[76] Inventor: Orville D. Brittell, 1001 Avenue of the States, Apt. 1106, Chester, Pa. 19013-5954

[21] Appl. No.: 236,191

[22] Filed: May 2, 1994

[51] Int. Cl.$^6$ .................................................. A01M 1/02
[52] U.S. Cl. .............................................. 43/121; 43/132.1
[58] Field of Search ........................ 43/107, 121, 132.1, 43/112, 144

[56] References Cited

U.S. PATENT DOCUMENTS

| 222,134 | 12/1879 | Herschman | 43/121 |
|---|---|---|---|
| 1,839,247 | 1/1932 | Moore | 43/112 |
| 4,953,320 | 9/1990 | Nelson | 43/121 |

Primary Examiner—Kurt Rowan

[57] ABSTRACT

A cockroach trap constructed of a container which has an heating element placed inside to heat bait to attract cockroaches. A first timer regulates power to the heating element, The container has a lid which in its initial position is open to allow the odor of the heated bait to attract the cockroaches. After a period of time to allow the cockroaches to amass on the bait, the lid closes over the container. A second timer regulates the means to close the lid. The heating element is turned on again. The bait boils thereby killing the entrapped cockroaches. The device can be reused each week to ten days for as many times as necessary thus ridding the area of successive generations with out any adverse side effects to pets or people.

2 Claims, 1 Drawing Sheet

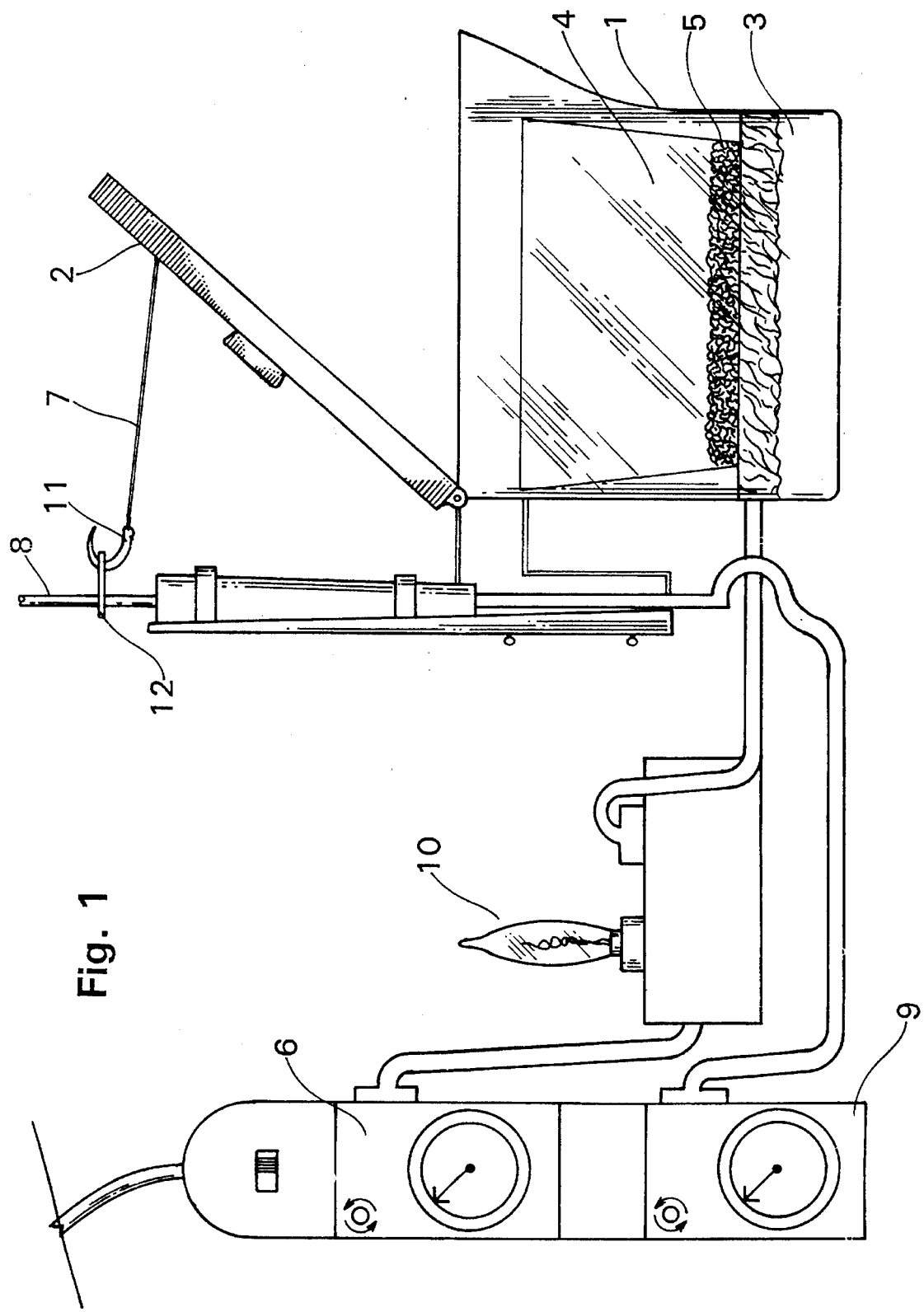

HEATED COCKROACH TRAP

BACKGROUND OF THE INVENTION

The subject invention involves a method of killing cockroaches wherein heat is used to kill the pests.

Humanity has always contended with the problem of the cockroach. There are places in our community which are especially concerned about cockroach infestation, such as hospitals, restaurants and homes. The aforementioned locations provide breeding grounds for the cockroach. The cockroach is a carrier of many diseases, and contaminates places where it has been lodged.

To destroy the infestation of cockroaches, the use of poisons has heretofore been the most effective exterminator. The use of poisons is a concern when used in the home as well as other places of frequent infestation. The poisons are, generally, made to adhere to the body of the cockroach so that it passes the poison on to others where they breed. Poisons, however, have not been found to be the optimum solution to the problem. One of the most daunting characteristics of the cockroach is its ability to reproduce, Reproduction allows the cockroach to multiply with sufficient variation that reproduction of poison-resistent individuals is a predictable result. After the repeated applications of these poisons, cockroaches become immune to the poison used and avoid treated areas.

The other alternative to the use of chemicals is adhesive materials. The materials, however, have been found to lack sufficient adhesion and tend to loose their adhesive properties to the extent that it will not entrap the cockroach.

High-voltage potential traps have been developed. The cockroach enters the electric field caused by the cathode and the anode the cockroach completes the circuit thereby destroying it. There are questions raised about the use of high-voltage, and the inherent danger under certain circumstances of high-voltage potential traps. U.S. Pat. No. 4,179,839 and U.S. Pat. No. 4,186,512 are examples of high-voltage potential traps.

The subject invention relates to a method of attracting cockroaches by heating a slurry of water and bait, and after a set period of time entrapping and killing the individuals.

It is clear that there is an urgent need for a solution that addresses the problem of cockroach infestation given the present state of the art of eradication of these purveyors of contamination. While advancements have been made in the use of poisons and adhesive materials, little progress has been achieved in developing a comprehensive solution that rids places of cockroach infestation and especially of reproductive females.

The subject invention completely obviates all of the shortcomings of the above described prior arts by providing a low-voltage non-poisonous method which eliminates cockroach infestation.

U.S. Pat. No. 4,953,320 to Nelson issued Sep. 4, 1990, teaches a method of heating a slurry of water and bait and killing the cockroaches with heat in a small area. However, this small area is not as effective for mass killing of cockroaches as a fair size container of freshly heated slurry of water and bait. Moreover, it not only fails to seal the area but also it only permits periodic heating to kill individual cockroaches as they enter the trap.

SUMMARY OF THE INVENTION

The subject invention is directed toward the heating of a slurry of water and bait such as food scraps and/or pheromones which attracts the cockroaches into the container with the slurry. The container then seals to prevent the individual cockroaches from escaping. The slurry is again heated to a boil to kill the entrapped individuals. More specifically the subject invention functions as a mechanism which by the process of boiling a slurry of bait and water the odor of food and/or pheromones permeates the area. As the bait is allowed to cool, the odors draw the cockroaches into the open container. Next the container is shut and the bait is reheated thereby killing the entrapped cockroaches. It is recommended that the invention be used repeatedly every week to ten days to attract and kill the successive generations of cockroaches.

BRIEF DESCRIPTION OF THE DRAWINGS

FIG. 1 displays the side view of the preferred embodiment of the invention.

DETAILED DESCRIPTION OF THE PREFERRED EMBODIMENT

Reference is now made to FIG. 1 in which there is illustrated in diagrammatic form the preferred embodiment of the subject invention. The diagram displays a container (1) with an opening at the top. The container has a hinged and slitted lid (2) which starts in the open position, and is able to close over the container. Inside the container at its bottom is a heating element (3) upon which a second container (4) with an opening at the top is placed. A slurry of bait and water (5) is placed inside the second container (4). A first timer (6) with two settings regulates power to the said heating element (3). The first timer's initial setting allows power to flow to the said heating element (3) thereby raising the slurry of bait and water (5) to a boil, to allow the odor of the bait to permeate an area. The slurry of bait and water (5) is allowed to cool attracting cockroaches. After the cockroaches have been attracted into the second container (4), a string (7) which has been attached to the lid (2) at one end and at the other end is connected to a hook (11) which is coupled to a rubber band (12) and holds the lid (2) open, the rubber band (12) is placed around a second heating element (8) and is severed when a second timer (9) with one setting regulates the power to the second heating element (8), by the second heating element (8). The first container (1) is thereby closed. The first timer's (6) final setting allows power to flow again heating the first heating element (3). The first heating element (3) inside the now closed container (1) brings again the slurry of bait and water (5) to a boil thereby killing the cockroaches trapped inside the first container (1). A light bulb (10) indicates when the power is flowing to the first heating element (3). To restart the device, the rubber band (12) is replaced and reconnected, the used slurry (5) is also replaced, the first timer (6) is reset to its initial setting, the second timer (9) is reset, and the lid (2) is placed in the open position.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed is:

1. An improved heated cockroach trap, which comprises:

(a) a container with an opening at the top;

(b) a slitted cover which is hinged to said container, the cover having an open position and a closed position, wherein the cover in the closed position closes completely over the opening of said container;

(c) a heating element which is placed in the base of said container;

(d) a second container with an opening which is placed upon said heating element in said first container;

(e) a slurry of nonpoisonous bait and water to attract cockroaches which is placed in said second container;

(f) a first timer which allows power to flow to said heating element to boil said slurry and then turns off;

(g) a means for allowing said cover to close over the opening of said first container; and (h) a second timer which triggers said means for allowing said cover to close over the opening of said container;

whereby said slurry is boiled and cooled, allowing odor of the bait to permeate an area and attract cockroaches into said second container, said cover is closed and said slurry is boiled again, killing said cockroaches.

2. An improved heated cockroach trap, which comprises:

(a) a container with an opening at the top;

(b) a slitted cover which is hinged to said container, the cover having an open position and a closed position, wherein the cover in the closed position closes completely over the opening of said container;

(c) a heating element which is placed in the base of said container;

(d) a second container with an opening which is placed upon said heating element in said first container;

(e) a slurry of nonpoisonous bait and water to attract cockroaches which is placed in said second container;

(f) a first timer which allows power to flow to said heating element to boil said slurry and then turns off;

(g) a string at one end attached to said cover connected to said cover and holding said cover in the open position;

(h) a hook attached to said string at the end opposite said lid;

(i) a second heating element;

(j) a rubber band looped around said second heating element and said hook;

(k) a second timer which regulates power to said second heating element;

whereby said slurry is boiled and coiled, allowing odor of the bait to permeate an area and attract cockroaches into said second container, said second heating element burns said rubber band thereby allowing said cover to close over the said first container and said slurry is boiled again killing said cockroaches.

* * * * *